US008233501B2

(12) United States Patent
Terry et al.

(10) Patent No.: US 8,233,501 B2
(45) Date of Patent: *Jul. 31, 2012

(54) TRANSPORT BLOCK SET SEGMENTATION

(75) Inventors: Stephen E. Terry, Northport, NY (US); Ariela Zeira, Huntington, NY (US); Nader Bolourchi, Larchmont, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 770 days.

This patent is subject to a terminal disclaimer.

(21) Appl. No.: 10/841,289

(22) Filed: May 7, 2004

(65) Prior Publication Data
US 2005/0047346 A1     Mar. 3, 2005

Related U.S. Application Data

(63) Continuation-in-part of application No. 10/279,365, filed on Oct. 24, 2002, now Pat. No. 6,975,650.

(60) Provisional application No. 60/357,198, filed on Feb. 13, 2002.

(51) Int. Cl.
*H04J 3/24*     (2006.01)
*G08C 25/02*    (2006.01)

(52) U.S. Cl. ..................... 370/473; 370/474; 714/748

(58) Field of Classification Search .......... 370/470–474, 370/332–335, 349
See application file for complete search history.

(56) References Cited

U.S. PATENT DOCUMENTS

| 5,224,098 | A |   | 6/1993  | Bird et al. |         |
|-----------|---|---|---------|-------------|---------|
| 5,751,970 | A | * | 5/1998  | Bournas     | 709/236 |
| 5,991,281 | A | * | 11/1999 | Hiramatsu   | 370/331 |

(Continued)

FOREIGN PATENT DOCUMENTS

CN     1277766 A     12/2000
(Continued)

OTHER PUBLICATIONS

Dottling et al., "Hybrid ARQ and Adaptive Modulation and Coding Schemes for High Speed Downlink Packet Access;" The 13$^{th}$ IEEE International Symposium on Personal Indoor and Mobile Radio Communications, vol. 3, 2002; pp. 1073-1077.
Choi et al., "A Class of Adaptive Hybrid ARQ Schemes for Wireless Links;" IEEE Transactions on Vehicular Technology; vol. 50, No. 3, May 2001; pp. 777-790.
"Adaptive Modulation and Coding (AMC);" Motorola Stockholm, Sweden, Oct. 20-24, 2000; Agenda Item: Adhoc#24; http://www.3gpp.org/ftp/tsg_ran/WG1_RL1/TSGR1_17/Docs/PDFs/R1-00-1395.pdf.

(Continued)

*Primary Examiner* — Gary Mui
*Assistant Examiner* — Hicham Foud
(74) *Attorney, Agent, or Firm* — Condo Roccia LLP

(57) ABSTRACT

Data of a transport block set is to be transmitted in a wireless communication system. The wireless communication system uses adaptive modulation and coding and has a physical layer hybrid automatic repeat request mechanism. Segmentation information for potential segmentation of the transport block set is provided. The transport block set is transmitted with a first specified modulation and coding scheme. The transport bock set is received and whether the received transport block set is determined to meet a specified quality. When the specified quality is not met, a repeat request is transmitted. The first specified modulation and coding set is changed to a second specified modulation and coding set. In response to the repeat request, the transmit block set is segmented into a plurality of segments supported by the second specified modulation and coding set in accordance with the provided segmentation information. The segments are transmitted and at least two of the segments are transmitted separately. The transmitted segments are received. The segmentation process may be applied more than once for a particular TBS transmission.

14 Claims, 5 Drawing Sheets

U.S. PATENT DOCUMENTS

| | | | |
|---|---|---|---|
| 6,208,663 B1* | 3/2001 | Schramm et al. | 370/465 |
| 6,226,301 B1* | 5/2001 | Cheng et al. | 370/474 |
| 6,308,294 B1 | 10/2001 | Ghosh et al. | |
| 6,359,877 B1 | 3/2002 | Rathonyi et al. | |
| 6,363,058 B1 | 3/2002 | Roobol et al. | |
| 6,400,699 B1* | 6/2002 | Airy et al. | 370/329 |
| 6,507,582 B1* | 1/2003 | Abrol | 370/394 |
| 6,553,003 B1* | 4/2003 | Chang | 370/256 |
| 6,570,849 B1* | 5/2003 | Skemer et al. | 370/230.1 |
| 6,647,477 B2 | 11/2003 | Janoska et al. | |
| 6,724,777 B1 | 4/2004 | Yamazaki et al. | |
| 6,920,152 B1* | 7/2005 | Chang et al. | 370/474 |
| 7,123,617 B1* | 10/2006 | Abrol | 370/394 |
| 2001/0055290 A1 | 12/2001 | Seidel et al. | |
| 2002/0006167 A1 | 1/2002 | McFarland | |
| 2002/0055290 A1 | 5/2002 | Jazowski et al. | |
| 2002/0071407 A1 | 6/2002 | Koo et al. | |
| 2002/0080719 A1* | 6/2002 | Parkvall et al. | 370/235 |
| 2002/0080902 A1 | 6/2002 | Kim et al. | |
| 2002/0133596 A1* | 9/2002 | Border et al. | 709/227 |
| 2002/0168945 A1 | 11/2002 | Hwang et al. | |
| 2002/0196812 A1* | 12/2002 | Yamaguchi et al. | 370/474 |
| 2003/0035440 A1* | 2/2003 | Casaccia et al. | 370/473 |
| 2003/0039229 A1* | 2/2003 | Ostman | 370/335 |
| 2004/0157600 A1 | 8/2004 | Stumpert et al. | |

FOREIGN PATENT DOCUMENTS

| | | |
|---|---|---|
| EP | 0776588 A1 | 6/1997 |
| EP | 0 869 647 A2 | 10/1998 |
| JP | 04-111554 | 4/1992 |
| JP | 09-093296 | 4/1997 |
| JP | 11-215192 | 8/1999 |
| JP | 2000-078117 | 3/2000 |
| JP | 2000-188609 | 7/2000 |
| JP | 2001-285261 | 10/2001 |
| JP | 2002-503918 A | 2/2002 |
| JP | 2005-273772 | 10/2005 |
| JP | 2009-303228 A | 12/2009 |
| TW | 217059 | 10/1997 |
| WO | 99/12303 | 3/1999 |
| WO | 99/41872 | 8/1999 |
| WO | 00/05911 | 2/2000 |
| WO | 00/08796 | 2/2000 |
| WO | 00/19676 | 4/2000 |
| WO | 00/33502 | 6/2000 |
| WO | 00/49760 | 8/2000 |
| WO | WO 00/74259 | 12/2000 |
| WO | WO 03/069818 A1 | 8/2003 |

OTHER PUBLICATIONS

Choi et al., "A Class of Adaptive Hybrid ARQ Schemes for Wireless Links," IEEE Transactions on Vehicular Technology, vol. 50, No. 3, May 2001, pp. 777-790.

Cordeiro et al., "Mitigating the Effects of Intermittent Interference on Bluetooth Ad Hoc Networks", the 13$^{th}$ IEEE International Symposium on Personal Indoor and Mobile Radio Communications, 2002, pp. 496-500, (Sep. 15-18, 2002).

Dottling et al., "Hybrid ARQ and Adaptive Modulation and Coding Schemes for High Speed Downlink Packet Access," The 13$^{th}$ IEEE International Symposium on Personal Indoor and Mobile Radio Communications, vol. 3, 2002, pp. 1073-1077.

Huang et al., "Resource Allocation Using Dynamic Packet Segmentation Control in Wideband CDMA Networks Supporting Multimedia Traffic", VTC 2002-Fall, 2002 IEEE 56$^{th}$ Vehicular Technology Conference Proceedings, vol. 1, Conf. 56, pp. 829-833, (Sep. 24, 2002).

Kim et al., "An Adaptive Segmentation Scheme for the Bluetooth-Based Wireless Channel", 10$^{th}$ International Conference on Computer Communications and Networks, 2001, pp. 440-445, (Oct. 15, 2001).

Lin, "Error Control Coding: Fundamentals and Applications", Automatic-Repeat-Request Strategies, Prentice-Hall, Inc., Englewood Cliffs, NJ, pp. 458-481, (1983).

Yang et al., "Adaptive Modulation and Coding in 3G Wireless Systems;" Aug. 6, 2002; http://www.cst.uwaterloo.ca/r/yang-khandani-2002.pdf.

European Patent Application No. 07 109 972: Communication Pursuant to Article 94(3) EPC (Examination Report) dated Aug. 23, 2010, 7 pages.

International Patent Application No. PCT/US2003/04333: International Search Report dated Jul. 8, 2003, 1 page.

International Patent Application No. PCT/US2003/04333: Notification of Transmittal of International Preliminary Report on Patentability dated Nov. 7, 2003, 3 pages.

European Patent Application No. 07109972.5: Extended European Search Report dated Oct. 5, 2007, 20 pages.

European Patent Application No. 10181235.2: Partial European Search Report dated Apr. 4, 2011, 9 pages.

* cited by examiner

TRANSPORT BLOCK SET SEGMENTATION

CROSS REFERENCE TO RELATED APPLICATION

This application is a continuation-in-part of U.S. patent application Ser. No. 10/279,365, filed Oct. 24, 2002, which claims the benefit of U.S. provisional application No. 60/357,198 filed on Feb. 13, 2002, both of which are incorporated by reference as if fully set forth.

BACKGROUND

This invention generally relates to wireless communication systems. In particular, the invention relates to transmission of data in such systems where adaptive modulation and coding (AMC) and hybrid automatic repeat request (H-ARQ) techniques are applied.

In wireless communication systems, such as the third generation partnership project (3GPP) time division duplex (TDD) or frequency division duplex (FDD) communication systems using code division multiple access (CDMA) or orthogonal frequency division multiplex (OFDM) systems, AMC is used to optimize the use of air resources.

The modulation and coding schemes (sets) used to transmit data are varied based on wireless channel conditions. To illustrate, a type of data encoding (such as turbo versus convolutional coding), coding rate, spreading factor for CDMA system, modulation type (such as quadrature phase shift keying, M-ary phase shift keying versus M-ary quadrature amplitude modulation), and/or a number of sub-carriers for an OFDM system may change. If channel characteristics improve, a lower data redundancy and/or "less robust" modulation and coding set is used to transfer data. As a result, for a given allocation of radio resources, more user data is transferred resulting in a higher effective data rate. Conversely, if channel characteristics degrade, a higher data redundancy and/or "more robust" modulation and coding set is used, transferring less user data. Using AMC, an optimization between air resource utilization and quality of service (QOS) can be better maintained.

Data in such systems is received for transfer over the air interface in transmission time intervals (TTIs). Data within a TTI transferred to a particular user equipment is referred to as a transport block set (TBS). For a particular allocation of air resources, a less robust modulation and coding set allows for larger TBS sizes and a more robust modulation and coding set only allows for smaller TBS sizes. As a result, the modulation and coding set for a given radio resource allocation dictates the maximum size of the TBS that can be supported in a given TTI.

In such systems, a hybrid automatic repeat (H-ARQ) request mechanism may be used to maintain QOS and improve radio resource efficiency. A system using H-ARQ is shown in FIG. 1. A transmitter 20 transmits a TBS over the air interface using a particular modulation and coding set. The TBS is received by a receiver 26. A H-ARQ decoder 31 decodes the received TBS. If the quality of the received data is unacceptable, an ARQ transmitter 28 requests a retransmission of the TBS. One approach to check the quality of the received TBS is a cyclic redundancy check (CRC). An ARQ receiver 22 receives the request and a retransmission of the TBS is made by the transmitter 20. To increase the probability of successful delivery, retransmissions may apply a more robust modulation and coding set. The H-ARQ decoder 31 combines, the received TBS versions. A requirement for combining is that combined TBS sizes are identical. If the resulting quality is still insufficient, another retransmission is requested. If the resulting quality is sufficient, such that the combined TBS passes the CRC check, the received TBS is released for further processing. The H-ARQ mechanism allows for data received with unacceptable quality to be retransmitted possibly at a more robust MCS to ensure successful delivery and maintain the desired QOS.

Another approach is to retransmit the TBS using the old modulation and coding set. However, if the channel conditions dictate that a more robust modulation and coding set be used or the initial transmission was severally corrupted, the combining of the retransmitted TBSs may never pass, resulting in a transmission failure.

In a system using both H-ARQ and AMC, a change in modulation and coding set may be determined necessary to achieve successful delivery of a requested TBS retransmission. In this situation, the maximum amount of physical data bits allowed within the TTI varies with the modulation and coding set.

Since only one TBS exists per TTI, the effective user data rate corresponds to the TBS size applied to each TTI. To achieve maximum data rates the largest TBS size is applied to the least robust modulation and coding set within the TTI. When wireless channel conditions require more a robust modulation and coding set for successful transmission, such a TBS size can not be supported within the TTI. Therefore, each time a more robust modulation and coding requirement is realized, all outstanding transmissions in H-ARQ processes with TBS sizes not supported by this MCS and have not been successfully acknowledged are discarded.

In current implementations, when a TBS cannot be successfully transmitted utilizing AMC and H-ARQ mechanisms, recovery is handled by the radio link control (RLC) protocol (at layer two). Unlike a H-ARQ recovery of failed transmissions, the RLC error detection, data recovery and buffering of a TBS queued in the transmitter (which may be at the node-B or user equipment as mentioned below) results in increased transport channel block error rates and transmission latency, potentially resulting in a failure to meet QOS requirements.

Accordingly, it is desirable to have alternate approaches to recover unsuccessful transmissions in such systems to allow for support of high data rates when AMC and H-ARQ techniques are applied.

SUMMARY

Data of a transport block set is to be transmitted in a wireless communication system. The wireless communication system uses adaptive modulation and coding and has a hybrid automatic repeat request mechanism. Segmentation information for potential segmentation of the transport block set is provided. The transport block set is transmitted with a first specified modulation and coding scheme. The transport bock set is received and the received transport block set is determined to meet a specified quality. When the specified quality is not met, a repeat request is transmitted. The first specified modulation and coding set is changed to a second specified modulation and coding set. In response to the repeat request, the transmit block set is segmented into a plurality of segments supported by the second specific modulation and coding set in accordance with the provided segmentation information. The segments are transmitted and at least two of the segments are transmitted separately. The transmitted segments are received. The segmentation process may be applied more than once for a particular TBS transmission.

BRIEF DESCRIPTION OF THE DRAWING(S)

DETAILED DESCRIPTION OF THE PREFERRED EMBODIMENT(S)

Transport block set segmentation can be used in a variety of wireless communication systems, such as FDD/CDMA, TDD/CDMA and OFDM communication systems.

Figure 1:
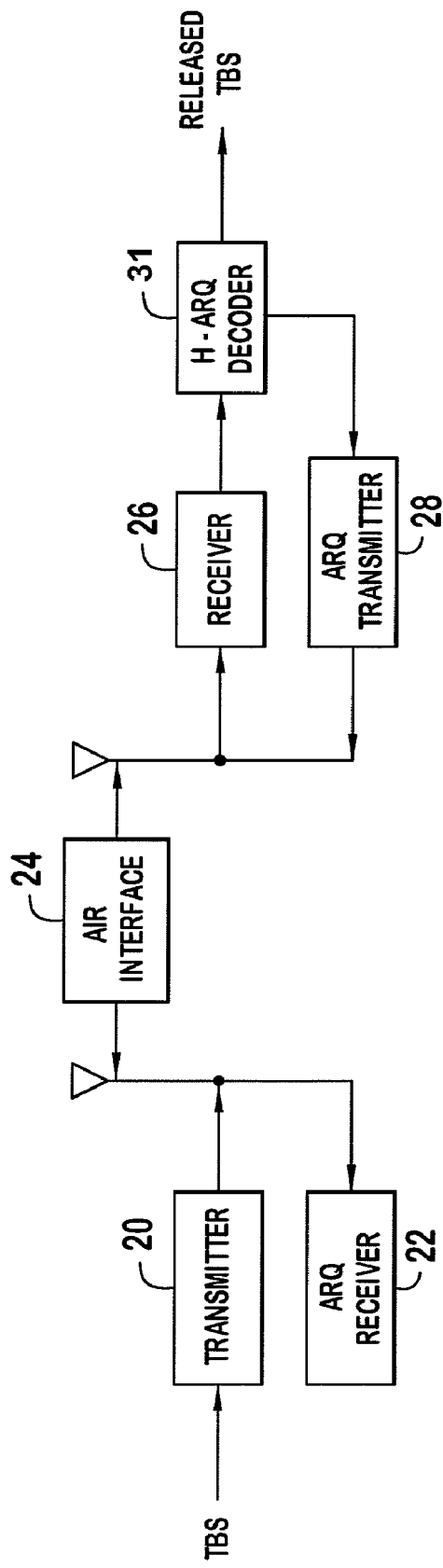
FIG. 1 is an embodiment of a wireless H-ARQ communication system.
Figures 2, 3A, 3B, 3C, 4:
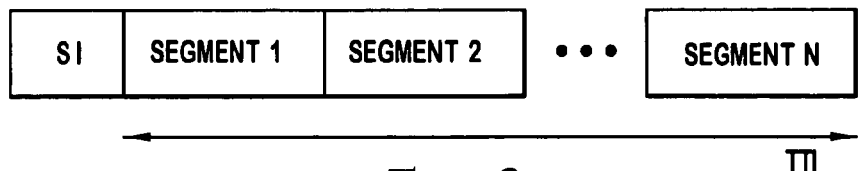
FIG. 2 is an illustration of a segmented TBS.
FIG. 3A is an illustration of a segmented TBS with a control message sent out-of band.
FIG. 3B is an illustration of a segmented TBS having segment identifiers.
FIG. 3C is an illustration of a segmented TBS with segment identifiers sent out-of band.
FIG. 4 is an illustration of a segmented TBS having transport sequence numbers.

To support high data rates, large TBS sizes are applied to each TTI. To allow for retransmission of large TBS sizes, at more robust modulation and coding sets to ensure successful delivery, segmentation information is provided with the TBS transmission. FIG. 2 illustrates a TBS with segmentation information (SI) in a TTI. The data within the illustrated TBS is segmented into multiple segments, segment 1 to segment N. Each segment is sized to have a data size that can be supported by a more robust modulation and coding set. Segmentation information (SI) is multiplexed with the TBS data. Although the segmentation information is shown as a header in FIG. 2, the segmentation information may be located anywhere within the structure of the TBS transmission (in-band). The segmentation information can be used for segmentation of the TBS.

Alternatively, FIG. 3A illustrates using control signaling to send segmentation information. The control signal is sent on a separate channel (out-of-band) from the segment data, segment 1 to segment N, (in-band). The segmentation information indicates the manner that the TBS was segmented for use in reconstructing the original TBS in the receiver.

FIG. 3B illustrates using a segmentation identifier (SID) as in-band segmentation information. Each segment, segment 1 to segment N, has a corresponding segment identifier, SID 1 to SID 2, multiplexed with that segment's data (in-band). FIG. 3C illustrates using a SID as out-of-band segmentation information.

FIG. 4 illustrates a preferred segmentation identifier for a segmented TBS. The medium access controller (MAC) assigns a transmission sequence number (TSN) to each potential segment. If the TBS is segmented, each segment's data is associated with that segment's TSN. As shown in FIG. 4, each segment has its own TSN, TSN 1 to TSN N. In a wireless communication system employing H-ARQ, TSNs are assigned to each TBS to allow for sequential processing. Using the TSN as a segment identifier reduces modifications required and minimizes additional complexity of the system to accommodate segmentation.

Figure 5:
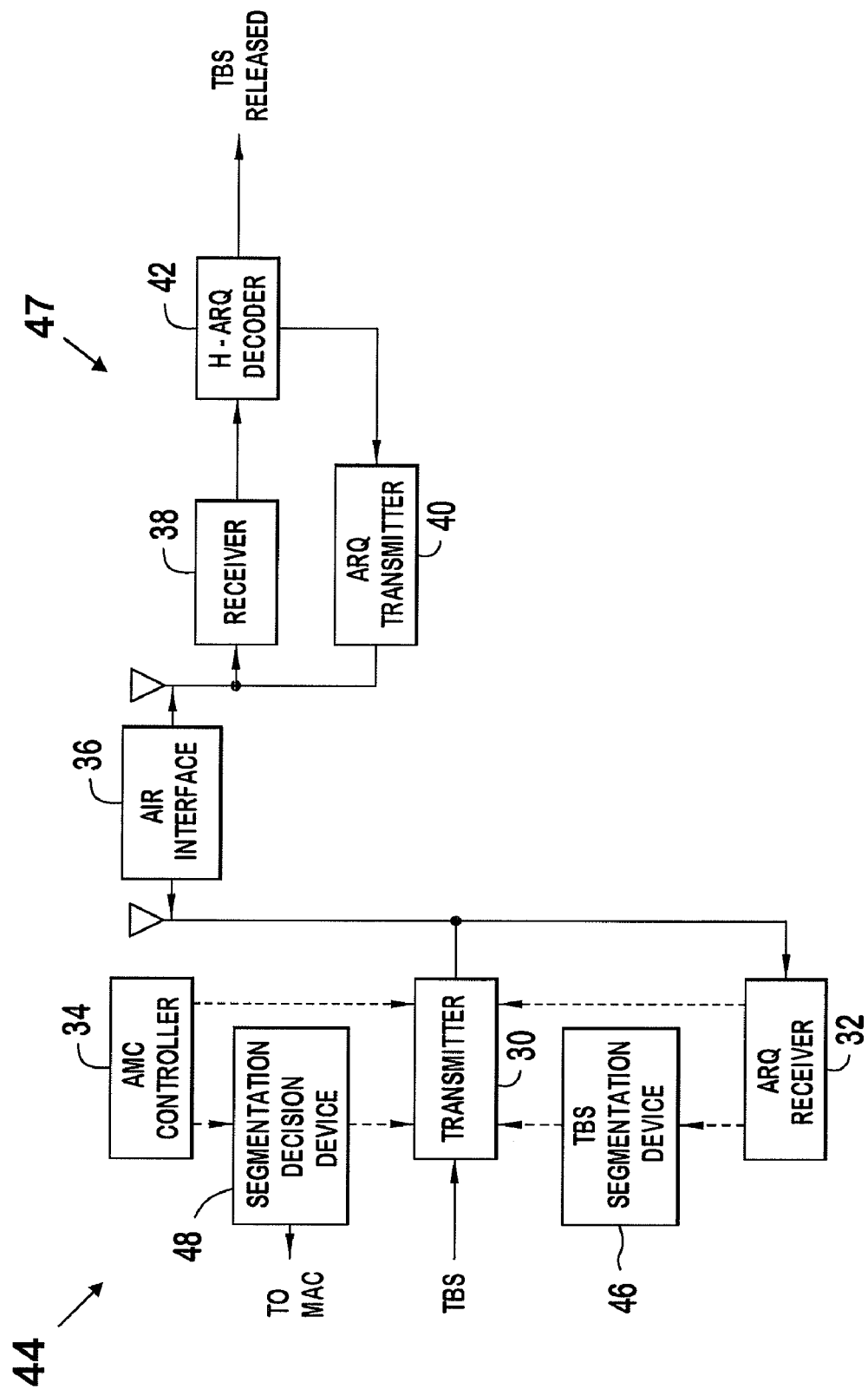
FIG. 5 is an embodiment of a segmented TBS wireless communication system.

FIG. 5 is a simplified diagram of a transmitter 44 and a receiver 46 for retransmitting a TBS in segments. The transmitting entity 44 may be located at either a user equipment or a base station/node-B. The receiving entity 46 may be located at either a base station/node-B or a user equipment. In current system implementations, AMC is typically only used in the downlink. Accordingly, the preferred implementation of transport block segmentation is for use in the supporting AMC for the downlink. For other systems using AMC in the uplink, transport block segmentation can be applied to the uplink.

A transmitter 30 transmits a TBS over the air interface 36. A receiver 38 receives the transmitted TBS. A H-ARQ decoder 42 decodes each received TBS. If the TBS fails the quality test, a request for retransmission is made by the ARQ transmitter 40. An ARQ receiver 32 receives the request and directs the TBS to be retransmitted. The retransmitted TBS is combined by the H-ARQ decoder 42 and another quality test is performed. Once the TBS passes the quality test, it is released for further processing.

Figure 6:
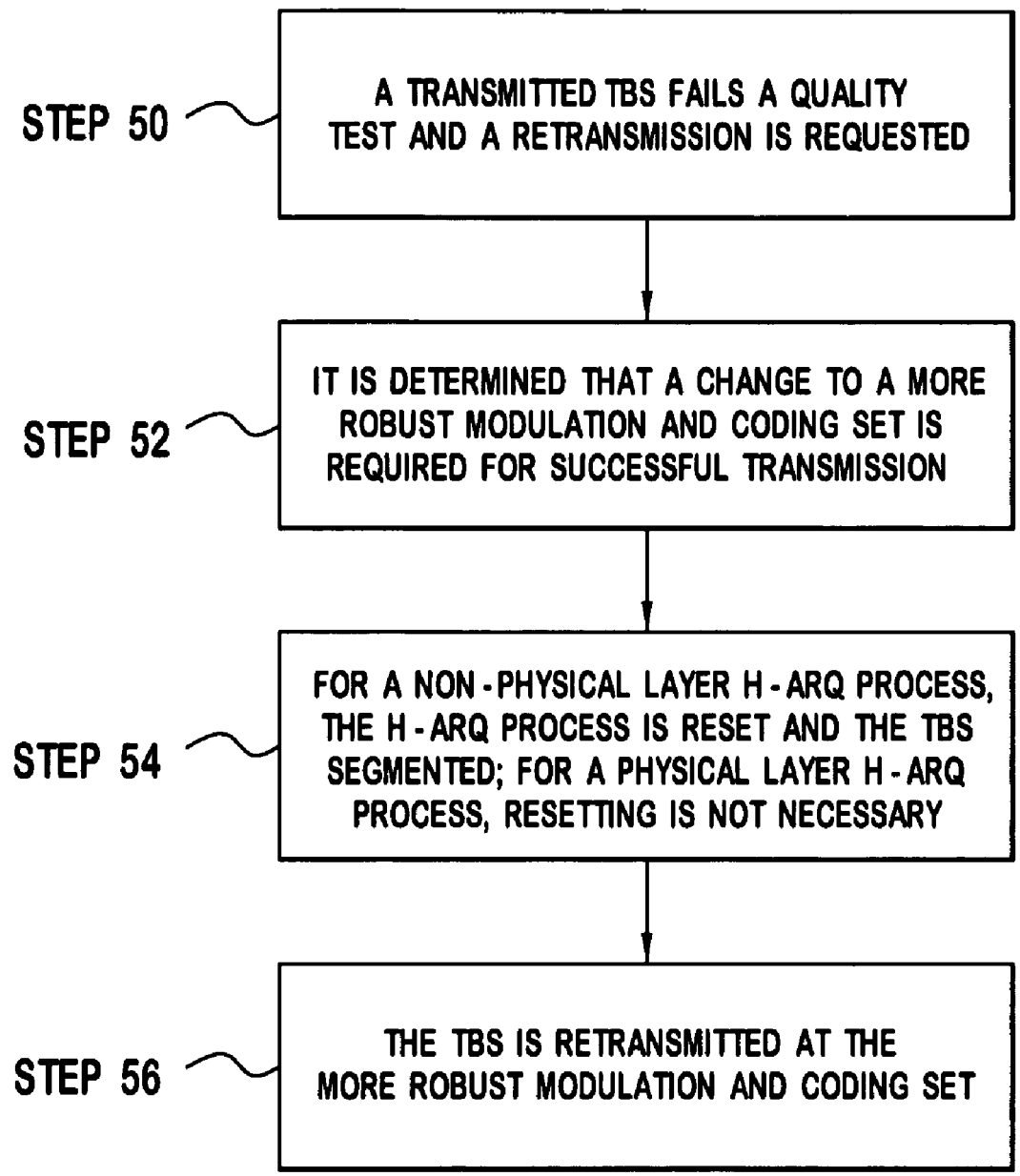
FIG. 6 is a flow chart of segmenting a TBS.

An AMC controller 34 is also shown in FIG. 5. If the channel conditions change, the AMC controller may initiate a change in the modulation and code set used to transfer data. FIG. 6 is a flow diagram illustrating such a change occurring in AMC between H-ARQ retransmissions. A transmitted TBS fails the quality test and a retransmission is requested, (step 50). To illustrate using FIG. 7, a TBS is transmitted and the received transmission fails the quality test, as indicated by an "X". It is determined that a change to a more robust modulation and coding set is required for successful transmission, (step 52). Since a more robust modulation and coding set is needed, retransmission of the same size TBS may not be possible. The H-ARQ process is reset and the TBS is segmented using the TBS segmentation device 46, (step 54). Typically, with physical layer segmentation, resetting the H-ARQ process is not necessary for proper operation. Each segment or subset of segments of the original TBS is at a size compatible with the new modulation and coding set. To illustrate using FIG. 7, the original TBS is segmented into three segments, SEG1, SEG2 and SEG3. The segments are retransmitted at the more robust modulation and coding set, (step 56).

Figure 7:
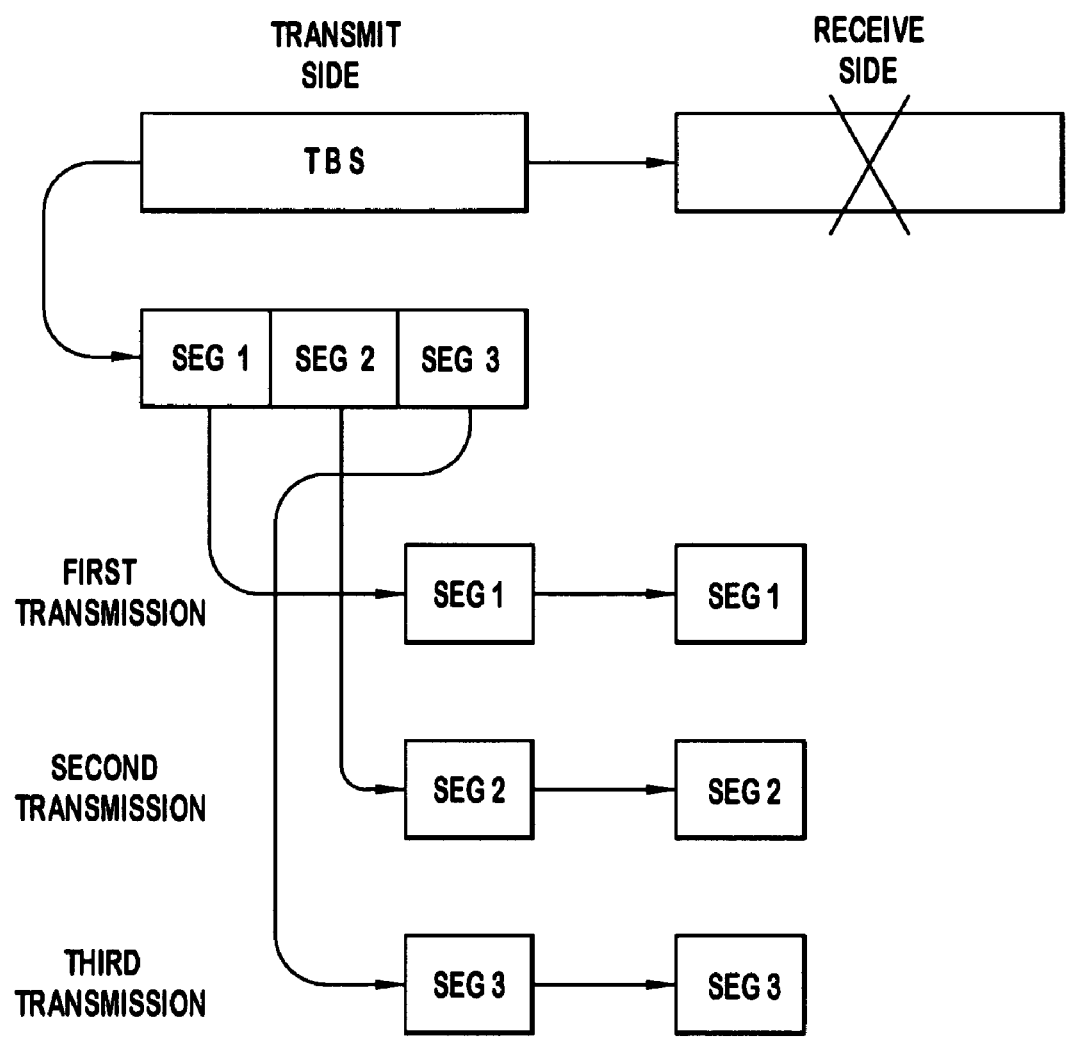
FIG. 7 is an illustration of segmenting a TBS into three segments.

Each segment or subset of segments is individually transmitted using the new modulation and coding set. As illustrated in FIG. 7, SEG1, SEG2 and SEG3 are separately transmitted and received. It is also possible depending on the choice of modulation and coding that any subset may be separately transmitted and received (SEG1 & SEG3, or SEG2 &SEG3, etc.). If a transmission of a segment or subset of segments fails, the ARQ transmitter 40 requests a retransmission of that segment or subset of segments. The transmission of the segment or subset of segments and the retransmission(s) are combined until the segment or subset of segments passes the quality test.

To reduce the added overhead required by the segmentation information, preferably, the transmitter selectively dictates when the segmentation option is to be utilized. To illustrate, if channel conditions are degrading or are predicted to degrade, the segmentation option may be utilized. This determination may be based on channel quality measurements, previous transmission success/failure rates for particular modulation and coding sets, or other criteria. A segmentation controller 48, preferably in the transmitter, as shown in FIG. 5, decides whether segmentation is to be supported. The segmentation controller coordinates operation with the MAC to add the segmentation information to the TBS. The segmentation decision may be based on various factors, such as cell loading, added users, number of prior retransmissions and measured channel quality. The availability of some of this information (e.g. cell loading and added users) to the transmitter depends on whether the transmitter is at the node-B or user equipment.

What is claimed is:

1. A transmitter apparatus comprising:
a transmitter configured to transmit a first data block having a sequence number using a first modulation and coding scheme utilizing a first plurality of orthogonal frequency division multiplexing (OFDM) subcarriers, the first modulation and coding scheme comprising a first modulation type and a first coding rate;
a segmentation device configured to segment the first data block into a plurality of data segments, and to append additional segmentation information that comprises a plurality of segment identifiers (SIDs) that indicate a manner of segmentation of the first data block, wherein an SID is assigned to each of the plurality of data segments, wherein the segmentation device is configured to determine the additional segmentation information subsequent to a Hybrid Automatic Repeat reQuest (HARQ) message requesting retransmission of data in the first data block; and
the transmitter further configured to transmit the segments with the plurality of SIDs using the second modulation and coding scheme utilizing a second plurality of OFDM subcarriers, the second modulation and coding scheme comprising a second modulation type and a second coding rate, wherein the first plurality of OFDM subcarriers is different than the second plurality of OFDM subcarriers, the first modulation type is different than the second modulation type, and the first coding rate is different than the second coding rate.

2. The transmitter apparatus of claim 1, further comprising a segmentation decision device configured to determine whether to selectively support segmentation.

3. The transmitter apparatus of claim 2 wherein the determination to support selective segmentation of a data block is based on added users.

4. The transmitter apparatus of claim 2 wherein the determination to support selective segmentation of a data block is based on a number of hybrid automatic repeat request retransmissions.

5. The transmitter apparatus of claim 2 wherein the determination to support selective segmentation of a data block is based on a measured channel quality.

6. The transmitter apparatus of claim 2 wherein the determination to support selective segmentation of a data block is based on a cell loading.

7. The transmitter apparatus of claim 1, wherein the segmentation device is configured to append segmentation information to each data segment after receiving the Hybrid Automatic Repeat reQuest (HARQ) message requesting retransmission of the first data block and before transmission of the plurality of data segments.

8. The transmitter apparatus of claim 1, wherein transmission of the first data block is in a first transmission time interval.

9. The transmitter apparatus of claim 8, wherein transmission of the plurality of data segments occurs in a second transmission time interval.

10. The transmitter apparatus of claim 9, wherein the first modulation type is a quadrature amplitude modulation (QAM) and the second modulation type is a quadrature phase shift keying (QPSK) modulation.

11. The transmitter apparatus of claim 1, wherein the plurality of SIDs are different types of identifiers than transmission sequence numbers.

12. The transmitter apparatus of claim 1, wherein the segmentation device is further configured to assign the plurality of SIDs to the plurality of data segments sequentially.

13. The transmitter apparatus of claim 1, wherein the first data block is not assigned an SID.

14. The transmitter apparatus of claim 1, wherein each of the plurality of SIDs identify a data segment as a segment of the first data block.

* * * * *